United States Patent [19]

Ducos et al.

[11] 4,225,785
[45] Sep. 30, 1980

[54] PROCESS FOR THE PRODUCTION OF A SENSITIVE PLATE FOR AN EXOELECTRON DOSIMETER

[75] Inventors: Maurice Ducos, Piolenc; Pierre Manfredi, Orange; Maurice Pétel, Bourg-la-Reine; Guy Portal, Massy, all of France

[73] Assignee: Commissariat a l'Energie Atomique, Paris, France

[21] Appl. No.: 32,015

[22] Filed: Apr. 20, 1979

[30] Foreign Application Priority Data

Apr. 27, 1978 [FR] France .................. 78 12511

[51] Int. Cl.² .............. G01J 5/10; G01T 1/115; B05D 3/06
[52] U.S. Cl. .................. 250/336; 219/121 P; 250/337; 250/472; 250/484; 357/29; 427/34; 427/77; 427/374.1; 427/423; 427/126.3; 427/126.4
[58] Field of Search ............... 427/34, 77, 126, 374 R, 427/423; 219/121 P; 250/336, 337, 472, 484; 357/29

[56] References Cited

U.S. PATENT DOCUMENTS

| | | | |
|---|---|---|---|
| 2,585,534 | 2/1952 | Bull et al. | 427/77 |
| 3,450,879 | 6/1969 | Seppi | 250/336 |
| 3,612,868 | 10/1971 | Becker et al. | 250/472 |
| 3,645,894 | 2/1972 | Krystyniak | 427/34 |
| 3,901,733 | 8/1975 | Toy et al. | 427/34 |
| 3,935,457 | 1/1976 | Moran et al. | 250/336 |
| 4,082,951 | 4/1978 | Moran | 250/336 |

OTHER PUBLICATIONS

Moran et al., "Medical Physics", vol. 1 No. 3 May–Jun. 1974, pp. 155–160.

*Primary Examiner*—John H. Newsome
*Attorney, Agent, or Firm*—Thomas R. Boland

[57] ABSTRACT

Process for the production of a sensitive plate for an exoelectron dosimeter by producing on a support a deposit of a mixture of two compositions constituted on the one hand by a substance having traps for the electrons and able to emit exoelectrons by thermal or optical stimulation and on the other by a substance having a good ionic conductivity, wherein it comprises making a homogeneous mixture of the powders constituting the two said compositions, producing by means of a plasma arc torch a plasma jet in the vicinity of the support on which the deposit is to be made and spraying said powder mixture into the jet to obtain a deposit which adheres to the support.

The exoelectron dosimeter comprises a support to which adheres a plate constituted by two substances, one of which has traps for the electrons and is able to emit exoelectrons by thermal or optical stimulation and the other has a good ionic conductivity.

19 Claims, 3 Drawing Figures

PROCESS FOR THE PRODUCTION OF A SENSITIVE PLATE FOR AN EXOELECTRON DOSIMETER

BACKGROUND OF THE INVENTION

The present invention relates to a process for the production of sensitive plates for exoelectron dosimeters.

Exoelectrons detectors are now well known. It is known that a plate made from certain crystalline materials has its electrons transferred from the valence band to the conduction band of the crystal lattice when it is subject to irradiation. A certain proportion of these electrons are captured in traps of the crystal lattice. These traps are either due to impurities of the crystal or to faults in the crystal lattice. In order to free the electrons from these traps, energy must be supplied to the crystal lattice. This energy supply process, called stimulation can have an optical or a thermal origin. By measuring the quantity of electrons which are freed in this way and which are hereinafter called exoelectrons, it is possible to deduce the irradiation dose previously absorbed by the sample. The electrons freed by the crystal during stimulation are detected and measured by an exoelectron reader during the stimulated exoelectron emission phenomenon. For example, this emission of exoelectrons is measured by means of a gas circulation Geiger-Muller counter or by a windowless electron multiplier.

In the French Patent Application filed on Sept. 17, 1976, by the Commissariat à l'Energie Atomique for "Materials for producing exoelectron detectors" materials are described which are particularly suitable for forming the sensitive plate of an apparatus for dosing radiation by exoelectron emission, said apparatus being conventionally called a dosimeter.

In the above-mentioned French patent application, which forms an integral part of the present description, the fact that the material for making the sensitive plate of the device for measuring the radiation by exoelectron emission is characterised in that it comprises a first member having traps for the electrons and which can emit exoelectrons by thermal or optical stimulation and a second member having a good ionic conductivity and able to give a solid material is described and claimed. Preferably, the second substance is made from alumina crystallised in the $\beta$ phase, preferably the first substance is selected from the first group comprising $\alpha$ alumina and beryllium oxide. However, the first body may also be chosen from the group comprising $CaSO_4$; $BaSO_4$; $FCa_2$; $SrSO_4$ and $LiF$.

The sensitive plate of the dosimeter is in fact constituted by the deposit of a substance or more specifically the mixture of the substances defined hereinbefore on a support.

BRIEF SUMMARY OF THE INVENTION

The present invention relates to a process for carrying out the deposition of the mixture of the said substances on the plate, said deposition being in accordance with that described in the above-mentioned French patent application.

In general terms, the support on which the mixture of the substances having exoelectronic properties can be deposited comprises either a metallic member or a ceramic member.

For carrying out a deposition of this type, the following process has already been envisaged:

The mixture of the two substances each having the properties defined hererinbefore and for example the mixture of the two types of alumina ($\alpha$ and $\beta$) consists of making a pellet by means of the mixture of the two types of alumina and then performing fritting. However, during this operation, there are difficulties due to the deterioration of the ionic conduction at temperatures close to 1000° C. However, normally fritting is carried out at temperatures of about 1600° to 1800° C. It is admittedly possible to eliminate this problem by carrying out fritting in a carefully controlled sodium atmosphere, but nevertheless this process is very difficult to perform.

Therefore, the present invention relates to a process which is easier to perform and which nevertheless now makes it possible to effect this deposition of the mixture of substances on a plate, said deposit being solid, adheres well to the support and has interesting mechanical characteristics, without the fritting of the powder being necessary.

According to the invention, the process for producing a sensitive plate for an exoelectron dosimeter by making a deposit of a mixture of two compositions on a support comprises making a homogeneous mixture of the powders constituting the two compositions and the mixture of the powders is then sprayed by means of a device for spraying said mixture of two compositions by atomization to obtain a deposit wich adheres to the support.

According to a first way of carrying out said process a plasma jet is produced in the vicinity of the support on which the deposit is to be made by means of a plasma arc torch and said powder mixture in a pulverulent form is sprayed into said jet to obtain a deposit which adheres to the support.

According to a second way of carrying out said process, said device is a chemical flame torch and said powder mixture in a pulverulent form is sprayed in said flame to obtain a deposit which adheres to the support.

According to a third way of carrying out said process, said homogeneous mixture of powders has the shape of a cord or a rod, and said device is a chemical flame torch adapted to be used with said cord or said rod.

Preferably, the deposit then undergoes heat treatment at a temperature between 300° and 900° C. However, if one of the compositions is $\beta$ alumina, this heat treatment can take place up to temperatures of about 1200° C. if the deposit is kept in a gaseous medium of sodium.

Preferably, the said powers have a grain size of about 5 microns.

The invention also relates to a sensitive plate for an exoelectron dosimeter, more particularly but not exclusively obtained by the performance of the preceding process in accordance with its various variants. The plate is constituted by a mixture of a substance having traps for the electrons and a substance having a good ionic conductivity. Preferably, this mixture is constituted by $\alpha$ alumina and $\beta$ alumina. However, the $\alpha$ alumina can be replaced by one of the substances indicated hereinbefore.

BRIEF DESCRIPTION OF THE DRAWINGS

The invention is described in greater detail hereinafter relative to non-limitative embodiments and with reference to the attached drawings, wherein show.

DETAILED DESCRIPTION OF THE PREFERRED EMBODIMENTS

As stated hereinbefore, the process comprises effecting a deposit of constant thickness on a plate. This deposit comprises two main compositions having the characteristics indicated hereinbefore. This deposit has appropriate mechanical properties and reliably and durably adheres to the plate.

According to the first way of carrying out the process comprises in a first stage preparing the support by cleaning its surface either by etching or sand blasting. Following this operation, the plate is ready to receive the deposit. For this surpose a homogeneous powder of the two constituents of the deposit is prepared (e.g. constituted by $\beta$ alumina and $\alpha$ alumina) and for homogeneity reasons, they have the same grain size distibution, which is preferably approximately 5 microns. When the mixture has been mixed, this powder is sprayed onto the plate in such a way that a correct deposit thickness and good homogeneity are obtained. To this end, the powder is sprayed into the flame of a blown arc plasma torch. This heating procedure for the powder makes it possible to obtain maximum temperatures of the order of 15000° C. ensuring a very good deposit quality. The thus obtained support coating is between 10 and 100 microns thick.

Preferably, after making the plate, the latter undergoes heat treatment at a temperature of between 300 and 900° C. The object of the upper limit is to prevent any deteriorations in the ionic conductivity properties of the second substance, said deterioration occurring at a temperature of about 1000° C.

However, in the case when the second substance is $\beta$ alumina, the heat treatment can be carried out at a higher temperature up to 1200° C. It is then necessary to carry out the heat treatment in a sodium-saturated medium. This prevents the sodium ions from leaving the $\beta$ alumina, this impurity in fact provides the ionic conduction properties. However, it should be noted that even in this case, working then still takes place at well below the temperature ranges corresponding to the process using fritting.

The heat treatment serves to eliminate tribo-excitation phenomena created during the process of spraying the pulverulent mixture onto the supportplate.

Figure 1:
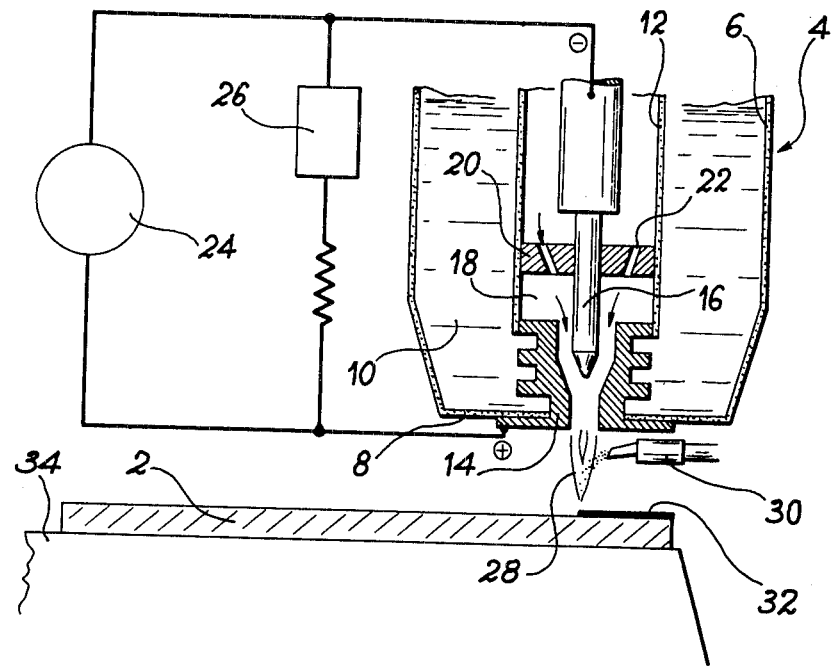
FIG. 1 a vertical sectional view of a device for effecting the spraying and the deposition of the mixture having exoelectronic characteristics.

The plasma torch making it possible to make this deposit will now be described in greater detail relative to FIG. 1, which shows plate 2 to be coated with the deposit having exoelectronic properties. The blown arc plasma torch involves the dissociation of a gas in an electric arc and then using the energy or temperature obtained by the recombination of this gas. This constriction imposed on the arc in the torch makes it possible to reach high temperatures up to 15000° C.

The actual torch 4 has an end fitting 6 constituted by a hollow wall 8 in which can circulate a cooling fluid such as water. In the bore 12 made in wall 8, a nozzle 14 defining the flame shape is located at its lower end. Nozzle 14 is made from an electrically conductive material which is at the same time refractory. Nozzle 14 constitutes the anode of the device. Within the bore 12 is provided a rod-shaped cathode 16 which is arranged in the axis of bore 12. Bore 12 is subdivided into an upper region and a lower region 18 by a horizontal partition 20 provided with outlets 22. The gas which serves to bring about the temperature rise is injected into the lower region 18 through the thus charged tubes 22. Ionization of the gas is obtained by means of electrodes 14 and 16, for which purpose they are connected to the two terminals of a power source 24. The electric circuit comprises an HF generator 26 making it possible to ignite the electric arc which is obviously continuous. More specifically and preferably the cathode 16 is made from tungsten, whilst the anode is made from copper and is cooled by water circulation in the hollow body 8. The plasma jet outside nozzle 14 is indicated symbolically by 28. The device also comprises a powder admission tube 30, whose opening is directed towards the plasma jet 28.

This particular spraying procedure has the advantage that it is possible to obtain a very high speed plasma jet. Thus, it is possible to use very fine powders sprayed at high speed and which spend a very short time in the plasma jet. As a result, the deposit obtained largely retains the characteristics of the initial material, i.e. the powder, a good cohesion of the particles and consequently a low porosity of the deposit 32 made on plate 2. Obviously, plate 2 on which the deposit is to be made is fixed to a moving support 34 which can move with respect to nozzle 14 in order to carry out the complete deposition. For example, the support may be a "carrousel", i.e. the support 34 rotates in uniform manner so as to alternately pass in front of the plasma jet 28. Finally, it is possible to regulate the distance between nozzle 14 and support 34 in order to regulate the spraying parameters.

Figure 2:
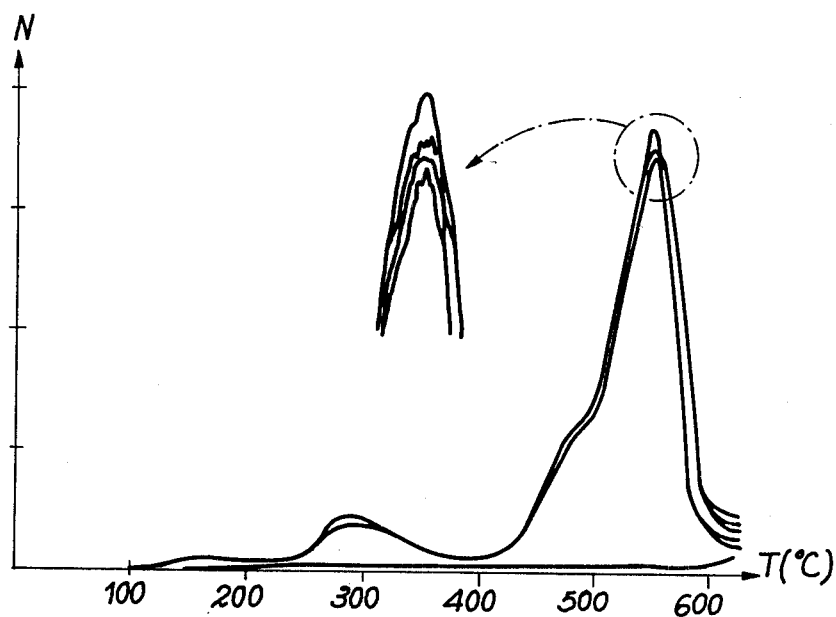
FIGS. 2 and 3 curves showing the results obtained with detectors or dosimeters whose sensitive plate has been produced in accordance with the process of the invention.

FIG. 2 shows a curve illustrating the characteristics of a sensitive plate obtained by spraying the mixture of $\alpha$ alumina and $\beta$ alumina by the process described hereinbefore. It is pointed out that the coating obtained in this way has an excellent mechanical strength and is virtually indestructible. Moreover, the dosimetric properties of the alumina mixture are retained. More specifically, the crystalline structure of the original compositions is not modified.

FIG. 2 shows the characteristic curves of thermostimulated electrons, which are representative of the dose integrated by the dosimeter using the sensitive plate. In this graph, the temperatures T are shown on the abscissa and the number N of exoelectrons emitted per second appears on the ordinate. The sensitive plate is exposed to a constant dose of 20 Rad. The standard variation calculated over 8 measurements is ±3.8%. The standard variation of the measurements carried out with a batch of sensitive plates irradiated with the same dose is approximately 8%. Thus, this process does in fact lead to sensitive plates of high quality and good reproducibility. The lower horizontal curve represents the background noise, i.e. the response of the non-irradiated dosimeter.

Figure 3:
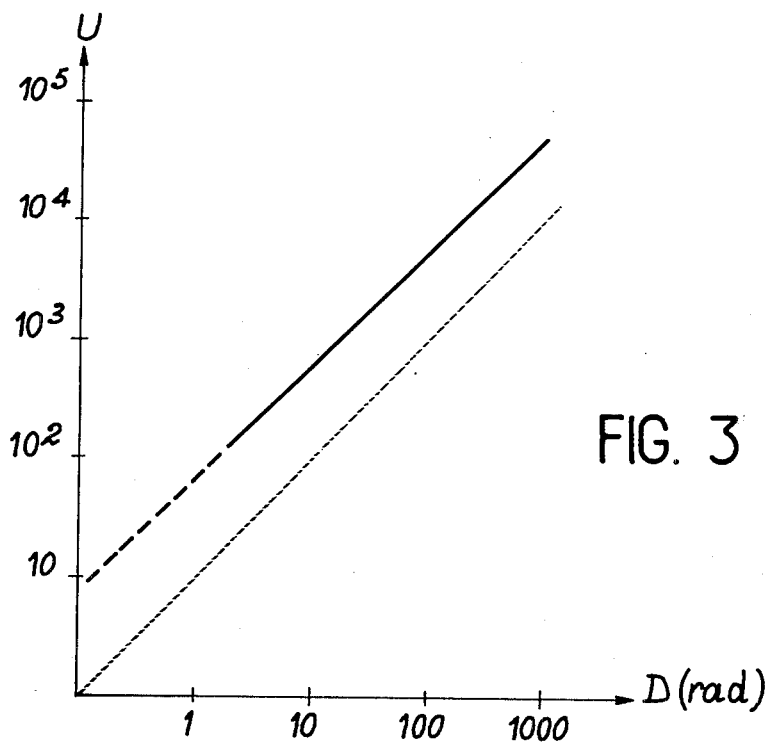

FIG. 3 shows the response (in arbitrary units U) as a function of the dose D in a dosage range between 1 and 600 Rad. All results shown in FIG. 3 coincide with those obtained from sensitive plates in powder form.

These results show that despite the temperature produced in simple manner during the production of the plate, the present process leads to the initial properties of the two substances used in the mixture being retained.

In the preceding embodiment, the case where the deposit has been produced by means of a mixture of α alumina and β alumina has been envisaged. It is obvious that without passing beyond the scope of the invention, it is possible to use a mixture having as the first substance the other substances indicated in the introduction to the description, e.g. $CaSO_4$; $BaSO_4$, $CaF_2$; $SrSO_4$ or LiF.

The sensitive plate having the composition given hereinbefore preferably has a thickness between 20 and 100 microns. It is for example disk-shaped and its diameter is about 18 mm. Moreover, in the case of a mixture of α and β alumina, a measuring sensitivity of the order of 100 millirads is obtained.

As hereinbefore described, a chemical flame torch can be substituted to the plasma arc torch. For example this torch is an oxyacetylene torch. Such a torch produces a temperature within the range of 2500° C. These torches can be used according to two different ways: Either the homogeneous mixture of powders is constituted by a flexible cord or a rod (similar to welding cords or rods). In this case the torch is adapted to guide said cord or said rod, or the mixture or powders is pulverulent. In this case the mixture is sprayed in the flame of the torch.

Herein after are two examples which illustrate the use of a chemical flame torch.

EXAMPLE I

An oxyacetylene torch is used (stoichiometric composition) the mixture is in the form of a flexible cord consisting in an homogeneous mixture of $SO_4Ba$ and $Al_2O_3 \beta$. The cord may further comprise a seath and a binder, as it is well known by the one skilled in the art. The spraying is produced by a flow of air at a pressure within the range of 4.5 atmospheres.

The support is made of sanded stainless steel.

EXAMPLE II

An oxyacetylene torch is used. The mixture of powders is a pulverulent mixture of $Al_2O_3 \alpha$ and $Al_2O_3 \beta$. This mixture is sprayed in the flame of the torch.

The support is made of sanded stainless steel.

This variant of the process makes possible to obtain a sensitive plate having the same characteristics as the ones of the plates obtained by a plasma arc torch.

What is claimed is:

1. A process for the production of a sensitive plate for an exoelectron dosimeter by producing on a support a deposit of a mixture of two compositions constituted on the one hand by a substance having traps for the electrons and able to emit exoelectrons by thermal or optical stimulation and on the other by a substance having a good ionic conductivity, wherein it comprises making a homogeneous mixture of the powders constituting the two said compositions, and spraying said powder mixture by means of a device for spraying said mixture of two compositions atomization to obtain a deposit which adheres to the support.

2. A process according to claim 1, wherein a plasma jet is produced in the vicinity of the support on which the deposit is to be made by means of a plasma arc torch and said powder mixture in a pulverulent form is sprayed into said jet to obtain a deposit which adheres to the support.

3. A process according to claim 1, wherein said device is a chemical flame torch and said powder mixture in a pulverulent form is sprayed in said flame to obtain a deposit which adheres to the support.

4. A process according to claim 1, wherein said homogeneous mixture of powders has the shape of a cord or a rod, and said device is a chemical flame torch adapted to be used with said cord or said rod.

5. A process according to any one of the claims 1 to 4, wherein it also comprises a heat treatment stage for the adhered deposit at a temperature between 300° and 900° C.

6. A process according to any one of the claims 1 to 4, wherein it also comprises a heat treatment stage of the adhered deposit at a temperature between 300° and 1200° C. in a sodium-saturated medium, the second substance being β-alumina.

7. A process according to any one of the claims 1 to 4, wherein the powders have a grain size of approximately 5 microns.

8. A process according to any one of the claims 1 to 4 wherein the second composition is alumina which is crystallised in the β phase and wherein the first composition is α alumina or beryllium oxide.

9. A process according to any one of the claims 1 to 4 wherein the first substance is chosen from the group comprising $CaSO_4$; $BaSO_4$; $CaF_2$; $SrSO_4$ and LiF.

10. A process according to claim 2, wherein the support is placed on a table for regulating the spraying distance and for displacing said support with respect to the plasma jet.

11. An exoelectron dosimetry device, wherein it comprises a support and on the latter a sensitive plate adhering to said support, the plate comprising a mixture of a substance having traps for the electrons and which is able to emit exoelectrons by thermal or optical stimulation and by a substance having a good ionic conductivity.

12. A device according to claim 11, wherein the substances are respectively α alumina and β alumina.

13. A device according to claim 11, wherein the substances are respectively a substance chosen from the group comprising BeO; $CaSO_4$; $BaSO_4$; $CaF_2$; $SrSO_4$ and LiF and β alumina.

14. A process according to claim 5, wherein the powders have a grain size of approximately 5 microns.

15. A process according to claim 6, wherein the powders have a grain size of approximately 5 microns.

16. A process according to claim 6, wherein the second composition is alumina which is crystallised in the β phase and wherein the first composition is α alumina or beryllium oxide.

17. A process according to claim 7, wherein the second composition is alumina which is crystallised in the β phase and wherein the first composition is α alumina or beryllium oxide.

18. A process according to claim 5, wherein the first substance is chosen from the group comprising $CaSO_4$; $BaSO_4$; $CaF_2$; $SrSO_4$ and Lif.

19. A process according to claim 7, wherein the first substance is chosen from the group comprising $CaSO_4$; $BaSO_4$; $CaF_2$ and LiF.

* * * * *